United States Patent [19]

Ly

[11] Patent Number: 4,714,011
[45] Date of Patent: Dec. 22, 1987

[54] PORTABLE BEVERAGE BREWING APPARATUS

[76] Inventor: Binh T. Ly, 1101 NW. 52nd St., #2, Ft. Lauderdale, Fla. 33309

[21] Appl. No.: 920,376

[22] Filed: Oct. 20, 1986

[51] Int. Cl.⁴ .......................... A47J 31/00; A47J 31/30
[52] U.S. Cl. ........................................ 99/279; 99/293; 99/300; 99/295
[58] Field of Search ................ 99/293, 294, 279, 280, 99/281, 282, 283, 300, 304, 305, 316, 295; 219/387, 281

[56] References Cited

U.S. PATENT DOCUMENTS

| 3,869,968 | 3/1975 | Ihlenfeld | 99/280 |
| 4,000,396 | 12/1976 | Abel, Jr. | 99/281 X |
| 4,083,295 | 4/1978 | Hollingsworth | 99/295 X |
| 4,151,790 | 5/1979 | Spirk | 99/281 |
| 4,382,402 | 5/1983 | Alvarez | 99/295 |
| 4,495,404 | 1/1985 | Carmichael | 99/279 X |
| 4,508,023 | 4/1985 | Naya et al. | 99/279 |
| 4,565,121 | 1/1986 | Ohya et al. | 99/281 |
| 4,634,838 | 1/1987 | Berz | 99/281 X |

Primary Examiner—James Kee Chi
Attorney, Agent, or Firm—Steele, Gould & Fried

[57] ABSTRACT

A beverage brewing apparatus which may be utilized with prepackaged water. The apparatus is provided with a puncturing means for puncturing the container. The water is heated to steam so that it is possible to utilize non-potable water in the brewing of a beverage.

9 Claims, 3 Drawing Figures

PORTABLE BEVERAGE BREWING APPARATUS

BACKGROUND OF THE INVENTION

The present invention relates to a portable beverage brewing apparatus which is used in combination with prepackaged and premeasured beverage making ingredients and water. The invention also relates to a beverage brewing apparatus that permits use of water which may not otherwise be considered as being potable.

PRIOR ART

Travel kits which incorporate certain food preparation abilities are known, such as for example, Aldridge et al, U.S. Pat. No. 4,037,081 of July 19, 1977, shows a lunch bucket with various compartments for flatware and food, as well as a heating element for warming the food. Mix, U.S. Pat. No. 3,385,952 of May 28, 1968 shows another form of an electrically heated lunch box which includes a thermostat and timer for controlling the heater. Other compact travel units are shown in Becker, U.S. Pat. No. 2,669,641 of Feb. 16, 1954 and Turnipseed, U.S. Pat. No. 2,513,218 of June 27, 1950.

U.S. Pat. No. 4,495,404 of Carmichael discloses a self-contained travel kit for brewing beverages such as coffee, tea and the like which is adapted to receive a small amount of water to be heated by an electric heater.

All of the known prior art beverage brewing apparatuses rely upon the use of water from conventional sources which are free from contamination and/or utilize premeasured and prepacked beverage making ingredients alone.

SUMMARY OF THE INVENTION

The present invention relates to a novel beverage brewing apparatus that is portable and can be utilized with water from a source which may not be considered as being potable. More particularly, the invention is concerned with a beverage brewing apparatus which evaporates water and utilizes the steam and its condensate to brew the beverage. A further important feature of the invention resides in the apparatus' capabilities of utilizing a prepackaging arrangement of premeasured beverage making ingredients and water.

Additionally, the beverage brewing apparatus is intended for use by sportsmen, travelers, boatsmen and the like who have a need for carrying food supplies with them.

The beverage brewing apparatus of the invention comprises a system wherein the water utilized is converted to steam and the steam together with its condensate contact the beverage making ingredients. Also, the apparatus is provided with an arrangement wherein a package of prepacked water can be punctured and the water released for use in the system.

The apparatus of the invention can be further provided with additional heating means to superheat the steam in order to make espresso coffee and the like.

The apparatus of the invention is especially for use with beverage making ingredients that are prepackaged within an envelope. The various beverage making ingredients include coffee, tea, clear broth, or the like.

A coffee brewing apparatus according to the invention is characterized by a housing having an open-top container adapted to receive a quantity of water. The water preferably is prepackaged in a measured volume in a puncturable package. The open-top container is provided with a means for puncturing the water package and a drain for the water. The water drains from the package into the container, and then into a reservoir which contains an electric heating means. The water is heated in the reservoir into steam which passes through a conduit to a receptacle containing the coffee to be brewed. Prior to contact with the coffee, the steam condenses in the conduit so that hot water contacts the coffee. Advantageously, the system is also provided with an auxillary heating means to prevent condensation of the steam for use in connection with preparing espresso coffee and the like. The brew from the coffee then goes in a known manner to a receptacle. The housing may also be provided with further heating means so as to heat the brewed coffee in the receptacle.

It is accordingly an object of this invention to provide a compact beverage making apparatus which can utilize both pre-packaged water and otherwise nonpotable water in the brewing process.

It is a further object of the invention to provide a coffee making apparatus which can be used in automobiles, boats and the like.

It is another object of the invention to provide a coffee making apparatus which can also be used in preparing espresso coffee and the like.

It is a yet still another object of the invention to provide a coffee making apparatus which is easy to construct, simple in design and can be used in locations where municipal water is not available.

Other objects and a fuller understanding of the invention will be had by referring to the following description and claims of a preferred embodiment, taken in conjunction with the accompanying drawings, wherein like reference characters refer to similar parts throughout the several views.

DESCRIPTION OF THE PREFERRED EMBODIMENT OF THE INVENTION

Figure 1:
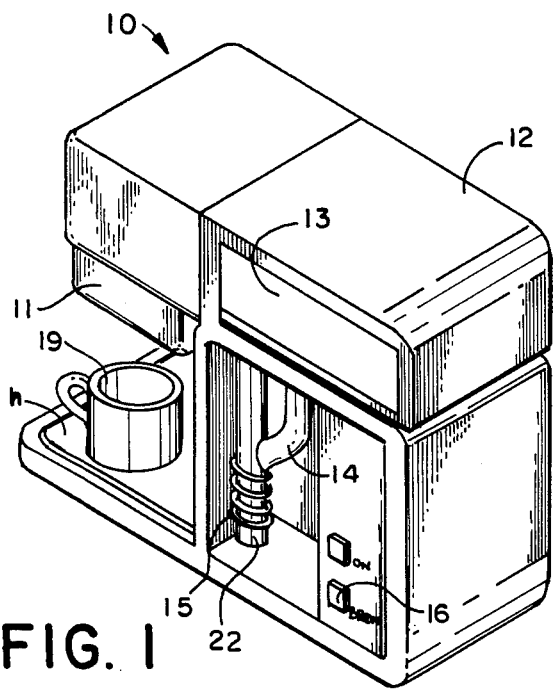
FIG. 1 is a perspective view of the beverage brewing apparatus of the invention partially in cross-section.

Although specific terms are used in the following description for the sake of clarity, these terms are intended to refer only to the particular structure of the invention selected for illustration in the drawings, and are not intended to define or limit the scope of the invention.

FIG. 1 illustrates a beverage brewing apparatus 10 according to the invention, for example, a coffee maker, which is provided with an open-top container 12 for receiving a measured amount of water. At the bottom of the container 12 is an opening which has inserted therein, in water-tight fit, a movable drain conduit 14. At the top of the conduit 14 is a puncturing means 13 which enters into the container 12 to puncture a water holding container (not shown) so as to drain the water.

The conduit 14 is connected to a reservoir 22 which receives the water. The reservoir 22 is associated with an electrical heating element 15 that is connected to switch means 16. Water that is heated in the reservoir 22 leaves the reservoir as steam through tube 18 which is in association with coffee making ingredients in a removable insert receptacle 11. The steam and/or its condensate brews the coffee. The brewed coffee from receptacle 11 then drains into a vessel 19. Optionally, the vessel 19 sits on a heating plate 17.

Figure 2:
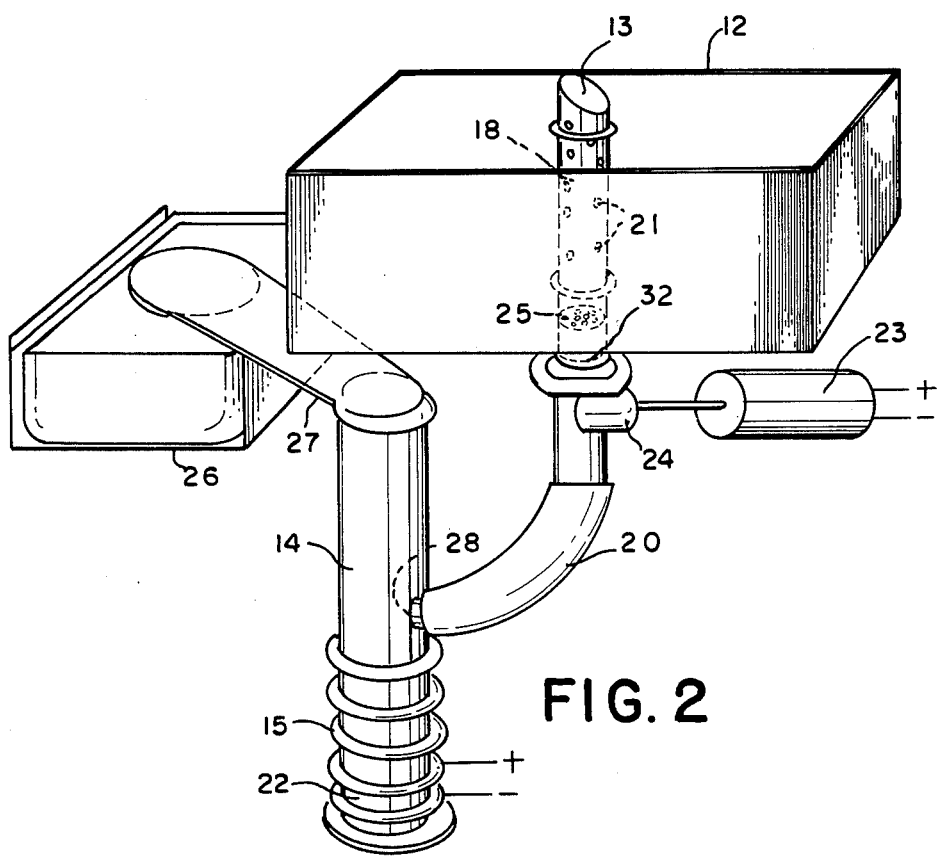
FIG. 2 is an exploded view showing parts of the water evaporation system.

As shown in FIG. 2, the puncturing means 13 may be formed as a part of the tube 18 which directs the water to reservoir 22. The tube 18 preferably contains drain openings 21 to expedite water flow and a filter 25 for the time when nonpotable water from a lake or stream is utilized. The tube 18 is in water-tight relationship with the container 12 by means of a seal 32. Means may be provided for moving the tube 18 so as to puncture a puncturable water container. The means for moving the tube 18 for puncturing may either be a manual or an automatic means, for example, as shown using the combination of a bi-directional gear 24 and motor means 23. The water from container 12 flows to the reservoir 22 through a flexible hose 20. The entrance to the reservoir 22 is automatically closed after the water enters by means of a flap 28 which prevents the exit of steam.

The water in the reservoir 22 is heated into steam by means of heating coil 15. The steam goes upward through conduit 27 where it condenses and forms the hot water for brewing the coffee in the insert 26.

Figure 3:
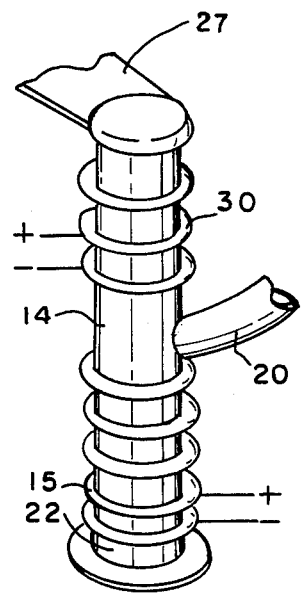
FIG. 3 is a view of the evaporation system of FIG. 2 adapted for superheating steam.

As seen in FIG. 3, the reservoir 14 may be provided with additional heating means 30 to prevent condensation of the steam in the conduit 27 so that the steam can be utilized to brew espresso coffee.

In the operation of the coffee making apparatus 10 it will be seen that water in a puncturable container (not shown) is placed into container 12. The puncturing means is activated to puncture the water container. The water passes through tube 18 into the reservoir 22 where the passage is closed by the flap 28. The water in the reservoir 22 is heated to form steam which leaves the reservoir 14 through the tube 27. The steam condenses within tube 27 and the hot water brews the coffee in insert 26. If desired, the steam is further heated within the tube 27 by auxillary heating means 30 so as to utilize the steam for brewing espresso coffee and the like.

Where water from a stream, lake, or the like is utilized, it may be prefiltered or filtered through filter 25. By evaporation of the water, it is possible to brew beverages utilizing water which would otherwise be considered as being non-potable.

The heating elements of the apparatus may be designed to operate either on conventional house current, such as 115 volts, or may be designed to operate from 12 to 24 volt power source for use on boats, in automobiles, campers, or the like.

The heating elements are preferably of the known kind which will open and disconnect themselves when the heating element exceeds a predetermined temperature, such as when all of the water boils off, or after water has been poured out of the vessel 19.

Although the invention has been described with a certain degree of particularity, it is understood that the present disclosure has been made only by way of example and that numerous changes in the details of construction and the conbination and arrangement of parts may be resorted to without departing from the spirit and scope of the invention.

What is claimed is:

1. A beverage brewing apparatus comprising:
    a housing, said housing having an open-top container adapted to receive therein a quantity of water, said open-top container having an opening at the bottom thereof for draining water therefrom by gravity;
    puncturing means at the bottom of said open-top container, said puncturing means adapted to puncture a puncturable water container;
    a reservoir having a pair of openings below said open-top container for receiving water from said open-top container;
    first conduit means associated with said open-top container and connected to one of said reservoir openings for conveying water into the reservoir;
    first electric heating means associated with said reservoir for heating and transforming the water in said reservoir into steam;
    a removable insert container receivable within said housing for storing ingredients necessary to brew a beverage; and,
    second conduit means associated with said insert container and said other reservoir opening for directing said steam from said reservoir to said beverage making ingredients.

2. The apparatus of claim 1, further comprising second heating means associated with said reservoir and independent from said first heating means to reduce condensation of said steam prior to contact with said beverage making ingredients.

3. The apparatus of claim 1, wherein said first conduit means includes said puncturing means.

4. The apparatus of claim 3, wherein said first conduit means is movably mounted for puncturing a puncturable container.

5. The apparatus of claim 4, further comprising motor means for moving said first conduit means so as to puncture a water container.

6. The apparatus of claim 4, further comprising manual means for moving said first conduit means so as to puncture a water container.

7. The apparatus of claim 1, further comprising means for filtering water from said open-top container to said reservoir.

8. The apparatus of claim 1, further comprising closure means for said open-top container.

9. The apparatus of claim 1, further comprising means for preventing steam from exiting through said first conduit.

* * * * *